US011355034B2

(12) United States Patent
Gutmann et al.

(10) Patent No.: US 11,355,034 B2
(45) Date of Patent: Jun. 7, 2022

(54) SYSTEMS AND METHODS OF BRAILLE TRANSCEIVING

(71) Applicants: John Gutmann, Lilburn, GA (US); Charles Redwine, Tucker, GA (US)

(72) Inventors: John Gutmann, Lilburn, GA (US); Charles Redwine, Tucker, GA (US)

(*) Notice: Subject to any disclaimer, the term of this patent is extended or adjusted under 35 U.S.C. 154(b) by 0 days.

(21) Appl. No.: 16/299,075

(22) Filed: Mar. 11, 2019

(65) Prior Publication Data

US 2019/0279528 A1 Sep. 12, 2019

Related U.S. Application Data

(60) Provisional application No. 62/641,341, filed on Mar. 10, 2018.

(51) Int. Cl.
*G09B 21/00* (2006.01)
*H04M 11/06* (2006.01)

(52) U.S. Cl.
CPC ......... *G09B 21/004* (2013.01); *G09B 21/007* (2013.01); *H04M 11/066* (2013.01)

(58) Field of Classification Search
USPC .......................................................... 379/52
See application file for complete search history.

(56) References Cited

U.S. PATENT DOCUMENTS

| 6,879,669 B1 * | 4/2005 | Perepa | H04M 11/10 379/93.27 |
| 8,090,885 B2 * | 1/2012 | Callaghan | G06F 9/44505 710/72 |
| 8,294,574 B2 * | 10/2012 | Haywood | H04W 4/90 340/540 |
| 9,081,545 B1 * | 7/2015 | Lin | G06F 1/1632 |
| 2002/0069068 A1 * | 6/2002 | Nemoto | G10L 13/00 704/271 |
| 2019/0112917 A1 * | 4/2019 | Disko | H04B 11/00 |

FOREIGN PATENT DOCUMENTS

| GB | 20010492 | * 11/2001 | |
| GB | 2006003706 | * 10/2005 | ............ H04M 11/00 |
| KR | 0132363 | * 4/1998 | |

* cited by examiner

*Primary Examiner* — Maria El-Zoobi
(74) *Attorney, Agent, or Firm* — Benjamin Balser; Next IP Law Group (57) ABSTRACT

Disclosed herein are example embodiments of systems and methods of braille transceiving. A braille input output transceiving device (BIOTD) comprises a transceiving module configured to receive braille codes, encode the braille codes into DTMF tones, and transmit the DTMF tones. The BIOTD enables transmission over various types of media, including audio DTMF tones and any networked communication device that can accept audio tones in the appropriate format.

12 Claims, 8 Drawing Sheets

SYSTEMS AND METHODS OF BRAILLE TRANSCEIVING

CROSS REFERENCE TO RELATED APPLICATION

This application claims benefit to U.S. provisional patent application Ser. No. 62/641,341, filed on Mar. 10, 2018, entitled Braille Apparatus and Systems, which is incorporated by reference herein.

FIELD OF THE DISCLOSURE

The present disclosure is generally related to communications and, more particularly, is related to a Braille communications device.

BACKGROUND

Braille is a tactile writing system used by people who are visually impaired. It is traditionally written with embossed paper. Braille users can read computer screens and other electronic supports using refreshable braille displays. They can write braille with the original slate and stylus or type it on a braille writer, such as a portable braille notetaker or computer that prints with a braille embosser.

Braille characters have rectangular blocks called cells that have tiny bumps called raised dots. The number and arrangement of these dots distinguish one character from another. Since the various braille alphabets originated as transcription codes for printed writing, the mappings (sets of character designations) vary from language to language. In English Braille, there are three levels of encoding: Grade 1—a letter-by-letter transcription used for basic literacy; Grade 2—an addition of abbreviations and contractions; and Grade 3—various non-standardized personal stenography.

Braille cells are not the only thing to appear in braille text. There may be embossed illustrations and graphs, with the lines either solid or made of series of dots, arrows, bullets that are larger than braille dots, etc. A full braille cell includes six raised dots arranged in two columns, each column having three dots (an enhanced braille cell includes 8 raised dots arranged in two columns of four). The dot positions are identified by numbers from one to six. There are 64 possible solutions using zero or more dots. A cell can be used to represent a letter, number, punctuation mark, or even a word. There are issues with previous braille communication devices.

GENERAL SUMMARY

Example embodiments of the present disclosure provides methods of braille transceiving. Briefly described, one example embodiment of the method, among others, can be implemented by following steps: receiving braille codes; converting the braille codes to DTMF tones; and transmitting the DTMF tones.

Example embodiments of the present disclosure can also be viewed as providing systems of braille transceiving. In this regard, one embodiment of such a system, among others, can be broadly summarized by the following: an input interface configured to receive braille codes; a processor configured to encode the braille codes into DTMF tones; and an output interface configured to transmit the DTMF tones.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Most braille communication devices involve a punch to produce bumps, pips, or impressions in a surface or canvas. Example embodiments of the systems and methods of braille transceiving disclosed herein comprise braille input output transceiving device (BIOTD) 502.

Disclosed herein are example embodiments of systems and methods of braille transceiving. A braille input output transceiving device (BIOTD) comprises a transceiving module configured to receive braille codes, encode the braille codes into DTMF tones, and transmit the DTMF tones. The BIOTD enables transmission over various types of media, including audio DTMF tones and any networked communication device that can accept audio tones in the appropriate format.

Figure 1:
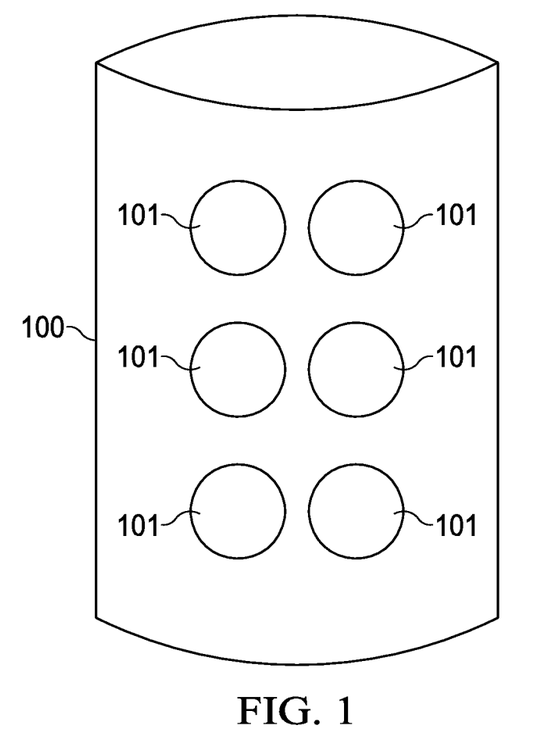
FIG. 1 illustrates a system view that shows an example of a single Braille input output transceiving device, according to an embodiment of the present disclosure.
Figure 2:
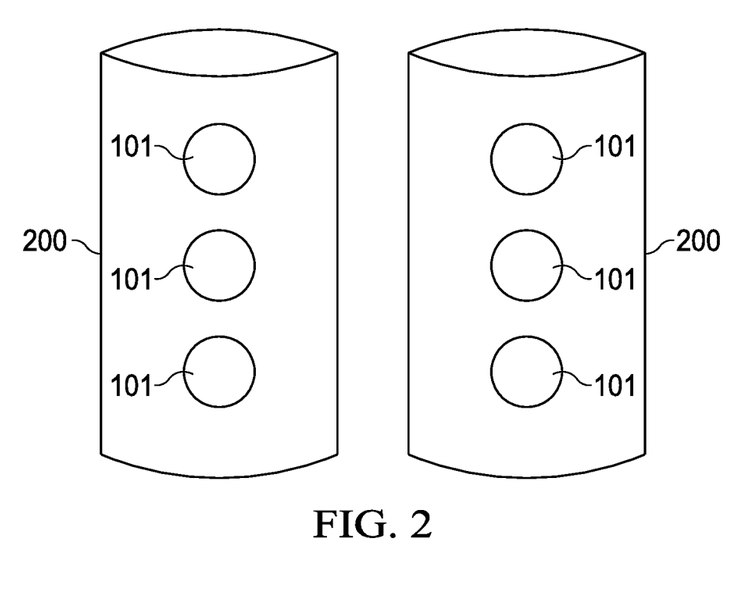
FIG. 2 illustrates a system view that shows an example of a dual Braille input output transceiving device, according to an embodiment of the present disclosure.

FIG. 1 is a front view of a single braille input output transceiver device (BIOTD) in accordance with an example embodiment. FIG. 2 is a front view of dual braille handheld devices in accordance with another example embodiment.

The braille handheld device of FIG. 2 can include a left handheld device and a right handheld device, each having three vertical buttons that are aligned with a person's index, middle, and ring fingers. The buttons on the left handheld device can be lighted in colors such as, for example, blue, yellow, and green from top to bottom, and can be assigned numbers 1, 2, 3, respectively. The right buttons of the right handheld device can be lighted in colors such as, for example, red, yellow, green, from top to bottom, and can be assigned numbers 4, 5, 6, respectively. Buttons or solenoid inner metal shafts, for example, can be pushed outward via solenoid, microswitch, et cetera, such that a person can feel the push buttons on his or her mid knuckles of the person's index, middle and or ring fingers. The lighted buttons can be used as visual braille codes. It should be noted that the braille handheld device can be configured and designed for six and/or eight finger usage.

In the example embodiment of FIG. 1, the braille handheld device combines the left and right handheld device to form a single BIOTD device comprising six buttons that are arranged in two columns of three rows. The six buttons function similarly as described with the dual devices of FIG. 2. The braille handheld device (either single or dual) can be used in conjunction with, but not limited to, cell phones, telephones, robots, TVs, etc. Throughout this disclosure, any reference to the braille input output transceiver device (BIOTD), includes both the single and dual implementations. In an example embodiment, the BIOTD may be integrated with a cell phone or a cell phone case, as well as many other everyday devices.

Figure 3:
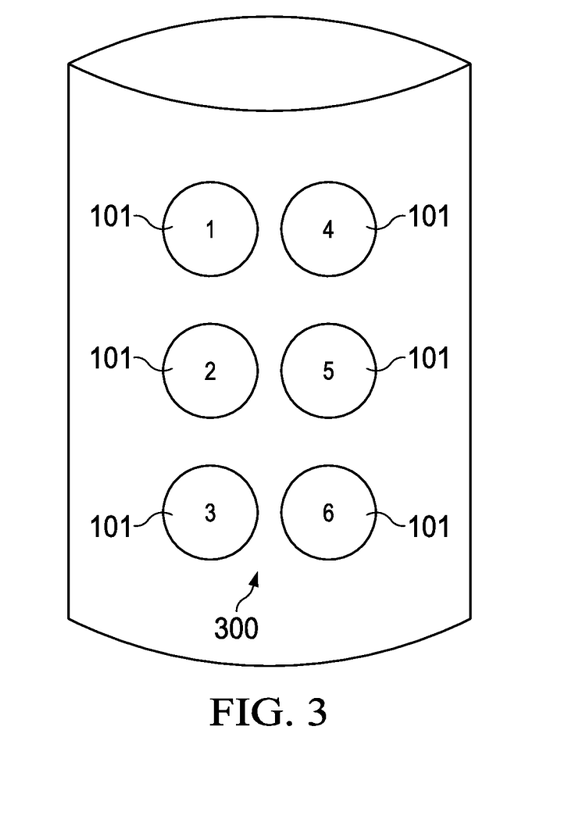
FIG. 3 illustrates a front side view that shows an example LED arrangement of the BIOTD of FIG. 1, according to an embodiment of the present disclosure.
Figure 4:
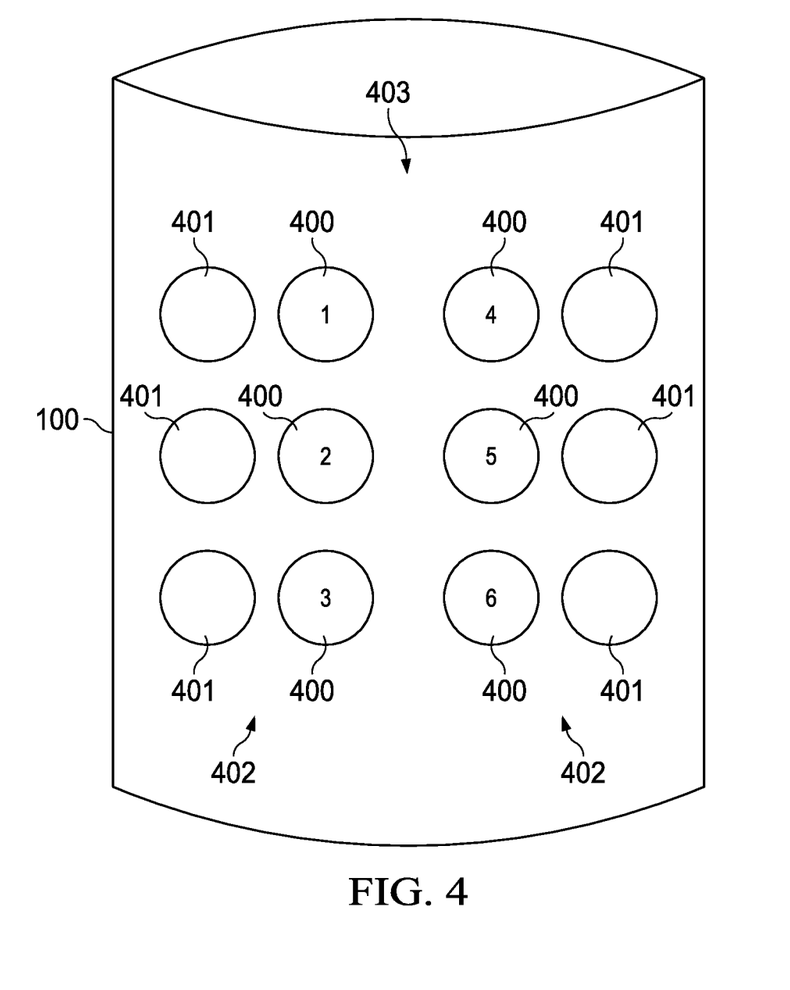
FIG. 4 illustrates a back side view that shows an example output actuator and input button configuration of the BIOTD of FIG. 1, according to an embodiment of the present disclosure.

FIG. 3 provides an example embodiment of a single BIOTD having a front side with six output LEDs arranged in two columns of three rows. The output LEDs may be labeled with numbers one through six, for example. FIG. 4 provides an example embodiment of the backside of a single BIOTD, which may include six input buttons that are labeled with numbers one through six and six output buttons, inner metal shafts of solenoids, or the like. The six output buttons, inner metal shafts of solenoids, or the like may be actuated by solenoids, microswitches, servos, stepper motors or any such other actuating devices.

Figure 5:
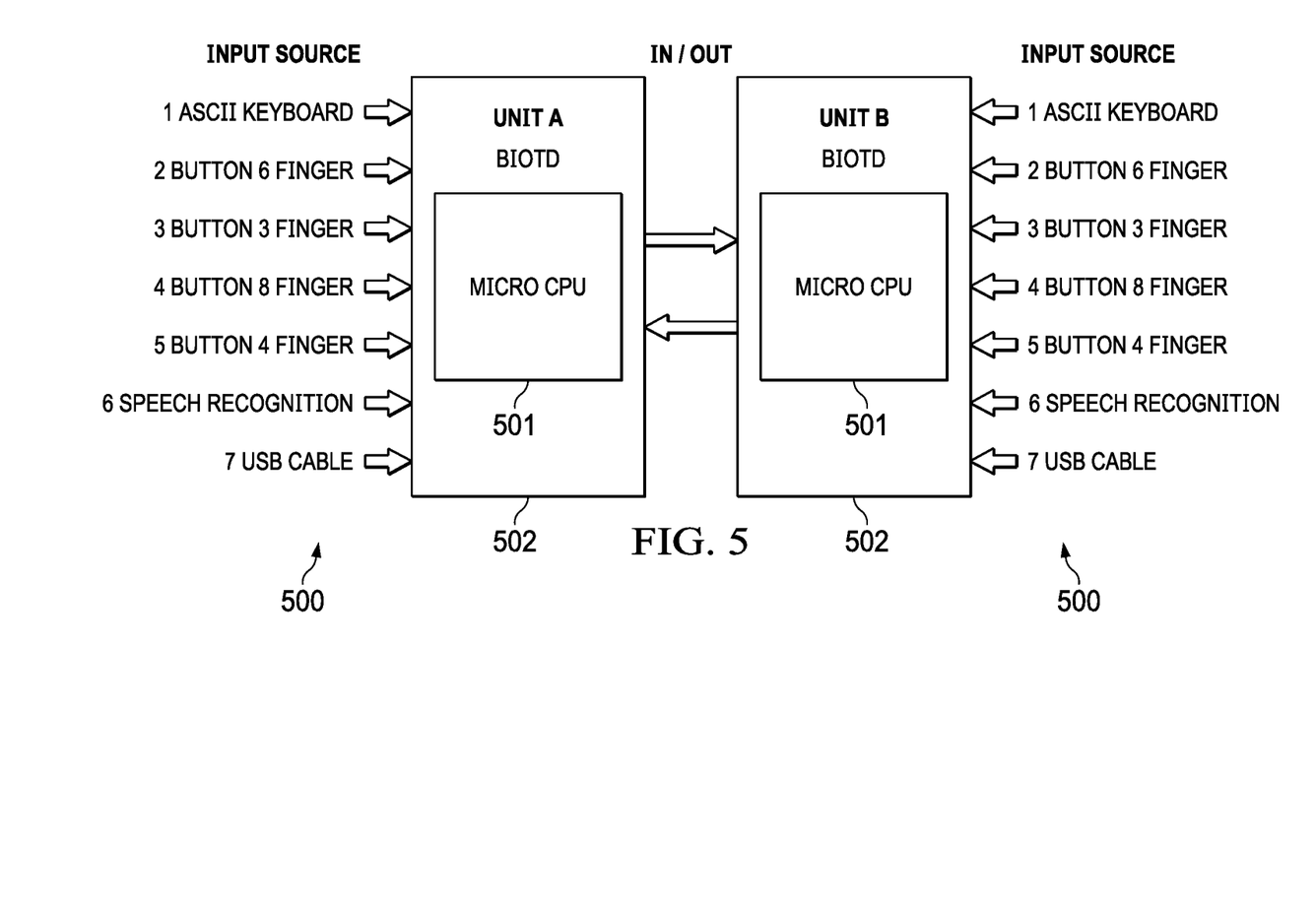
FIG. 5 illustrates a system view that shows an example of two BIOTDs communicating with the same or different input source types, according to an embodiment of the present disclosure.

FIG. 5 provides an example embodiment of two BIOTD units being used by two different people communicating with each other. The BIOTD units may be bi-directional. The two BIOTD units may be configured to be full duplex or half duplex, where unit B talks to unit A while unit A listens to unit B and vice versa. The microprocessors of units A and B can receive signals from ASCII keyboard, a six-finger button unit, three-finger button units, an eight-finger button unit, four-finger button units, a speech recognition device, and any input device connected by USB cable. The BIOTD units, while originally designed for blind people, may be adapted to accept inputs such that people with other disabilities may communicate. Other disabilities (or even without disabilities) that can use the BIOTD includes, but is not limited to, a normal sighted person, a partially sighted person or someone who is legally blind, a totally blind person, a deaf person, a mute person, an arm disabled person, a leg disabled person, and a veteran who can be described as disabled, among others. People may communicate with the devices in proximity to each other such that the DTMF tones output from one device may be detected by a second device. The DTMF codes may be amplified and sent to an external speaker to increase the distance over which the DTMF codes may be detected. Alternatively, the devices may communicate by transmitting and receiving over a network connection. Multiple network connection methods may be used, such as CAT-5, Wi-Fi, and Bluetooth, among others.

Figure 6:
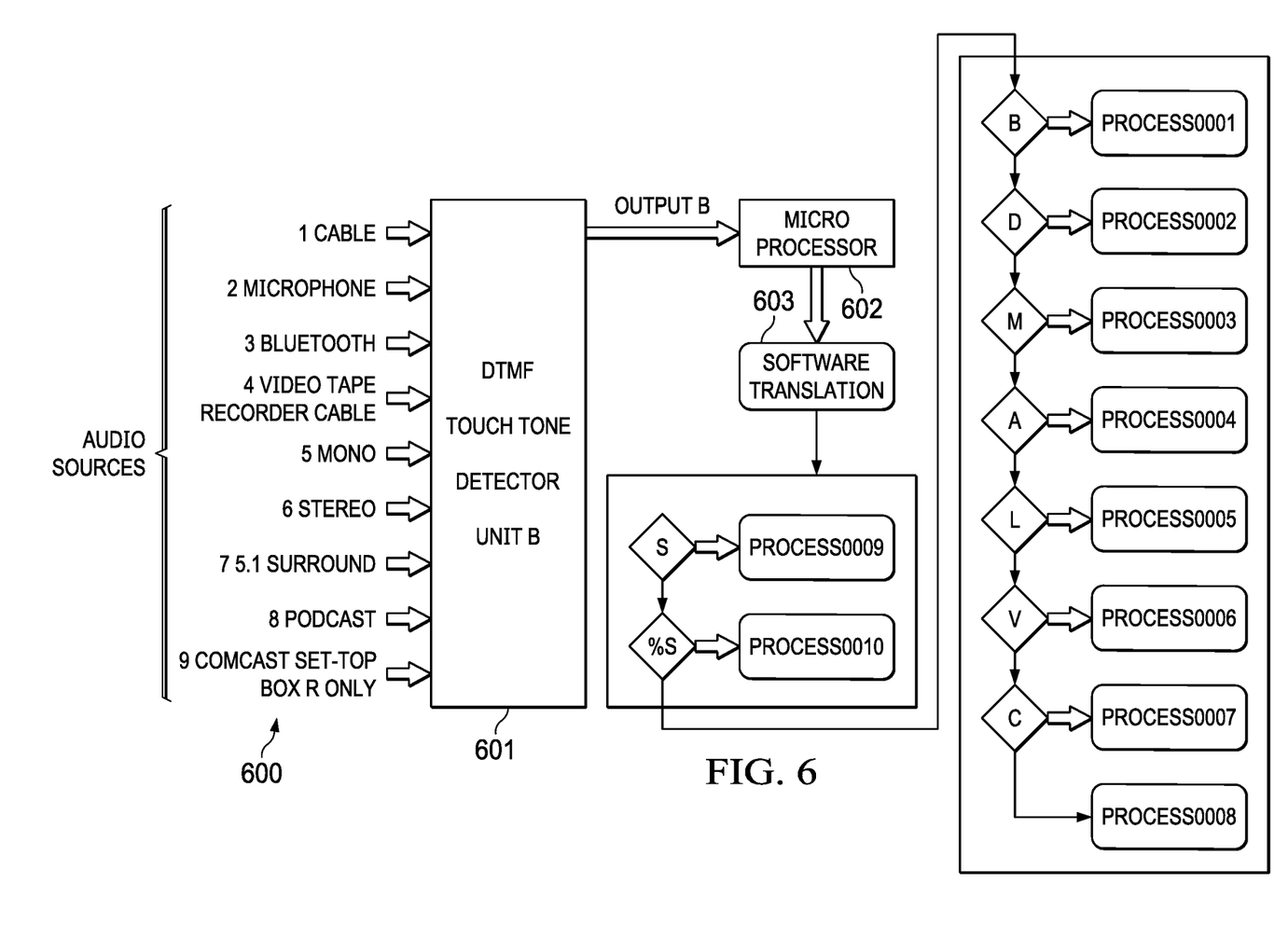
FIG. 6 illustrates a system view that shows an example of various input sources translated to various output types for various disability types, according to an embodiment of the present disclosure.

FIG. 6 shows a BIOTD, having two main hardware devices: DTMF or touchtone detector and a microprocessor. The input to the DTMF detector may be, for example, audio and the output may be a digital signal, which is fed to the microprocessor. The input of the microprocessor is a digital binary signal. The output of the microprocessor is a decision tree which may be routed to several different processes. Various input sources include audio cable, microphone, bluetooth, video tape recorder, mono audio, stereo audio, surround sound audio, podcast, and set top box, among others. The output of the DTMF touchtone detector is fed to the input of the microprocessor.

In an example embodiment, the audio sound input can be routed to a microprocessor for the DTMF detection. The flow chart shows an example decision tree for determining the disability of the receiving party, whether it is a sighted person, percent sighted, blind, deaf, mute, armed-disabled, leg-disabled or a veteran, etc. In addition, the BIOTD user can enable or disable any of the outputs for pass through mode.

An example implementation is a movie theater. The braille output codes may be used as a descriptive service, similar to closed captioning for the hearing impaired. Instead of text on the screen, braille codes may be sent in serial sequences in sync with what is seen visually on the screen to describe those scenes. In an alternative embodiment, the braille codes can be converted to other formats depending on the disability of the user.

In another example implementation, the input to the BIOTD is the right channel audio source. DTMF codes similar to the closed captioning line for the deaf can now see with their fingers what is visually happening on the screen or is audibly present. So, the deaf listen with their fingers instead of listening with their ears. The blind person, through their fingers and braille, understands what is normally seen and understood with the eyes.

In another example implementation, the input and output are transmitted through a phone. The DTMF codes are in the audio frequency range between 300 and 3000 hertz bandwidth. Those DTMF codes can be transmitted through the phone call connection so that two users with BIOTDs on either side of the call can communicate. A cell phone may be configured with an application installed to work with the BIOTD attached underneath the cell phone, for example.

In another example implementation, a streetlight may be configured to emit the DTMF codes that can be received by the BIOTD to inform a user on where he can be seen by other people. For example, a blind person cannot tell if he is in a lighted area or in the dark. The signal from the streetlight could inform the user that he is in an area that is illuminated by the streetlight.

In another example implementation, a traffic crossing sign or traffic light can be configured to signal the state of the crossing sign, the state of the traffic signal (red, yellow, green), street names and directions, among other traffic/safety information. A railroad crossing sign can be configured to warn the disabled of possible hazards or train traffic. A subway train or rail system can be configured for informing a person of the level location, direction of travel, departure times for upcoming trains, among other information. An airport landing system can be configured to warn the user that a plane is taking off or landing. An unmanned automated vehicle can be configured to inform the user that it is flying overhead with an Amazon delivery of pizza, for example. A street stoplight or caution signal can be configured to transmit a warning signal as well as giving the street name(s), intersection, direction, etc. A website can be configured with BIOTD embedded codes to inform the person of content. A ham radio channel can be configured with BIOTD sequential codes for a commercial AM or FM or side band audio radio station.

In an example implementation, an active (computer generated) or passive board game can be configured to inform the user through the BIOTD of game situations and information. The board game may be implemented as a stand-alone arcade game, on a cell phone, on a laptop, and a desktop, among others. In another example implementation, a cash register, such as at a retail store, or a point of sale (POS) device may be configured to inform the user through the BIOTD of sale information, such as number of items, price charged, discount, subtotal, taxes, and total, among other information.

In an example embodiment, particularly with a stereo audio implementation with two or more channels, the DTMF signals from or to the BIOTD can be transmitted on one channel and the voice and other audio signals can be transmitted on the other channels.

Figure 7:
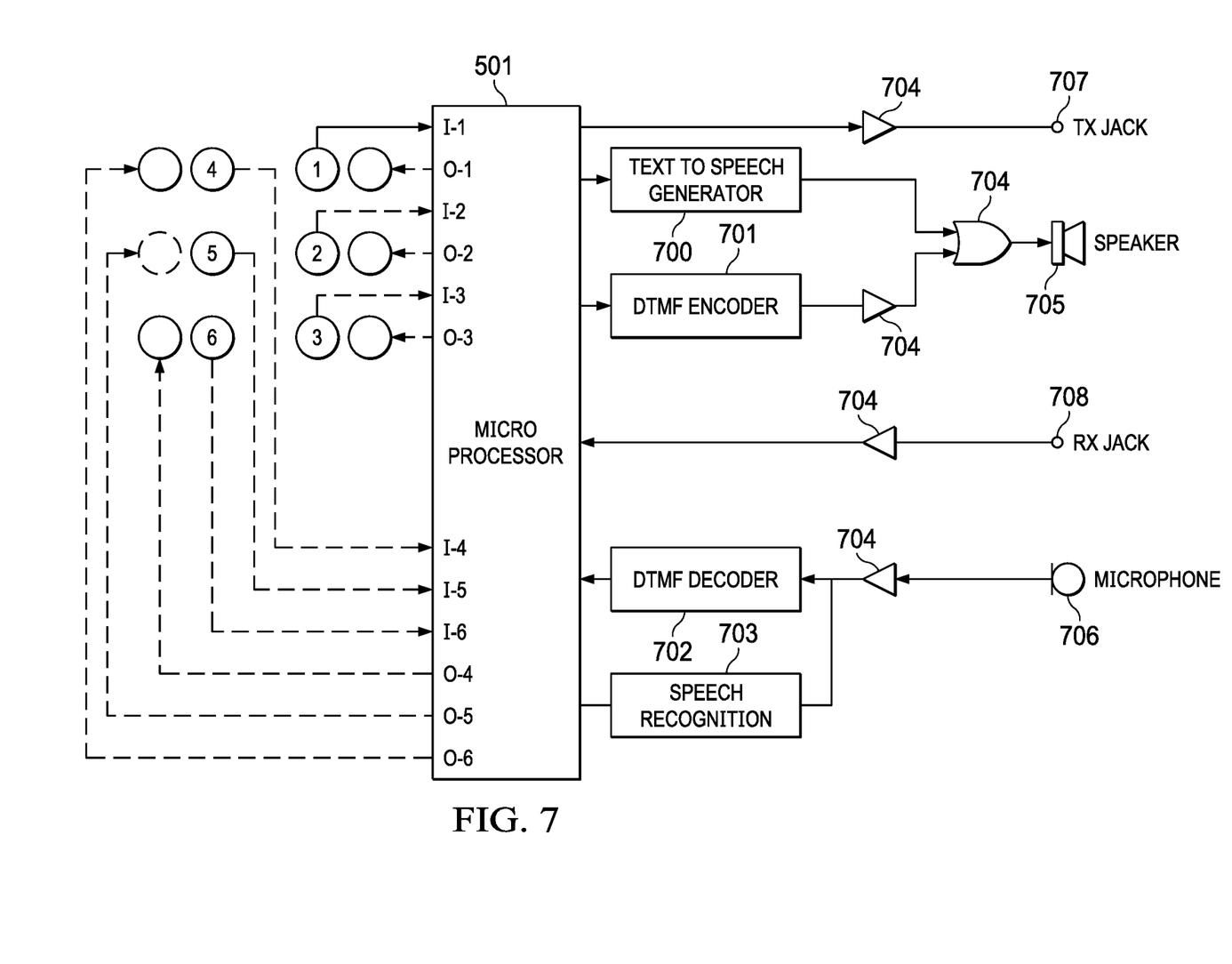
FIG. 7 illustrates a system view that shows an example encoding from braille input to DTMF output and decoding from DTMF input to braille output, according to an embodiment of the present disclosure.

FIG. 7 provides an example embodiment of an acoustic implementation of the BIOTD. The user inputs a braille code using input buttons. The microprocessor can be configured to arrange the input into a text string and send the text string to a text to speech generator. The speech generated by the text to speech generator can then be output through the speaker. Alternatively, the microprocessor can send the codes to the DTMF encoder, which generates the DTMF codes, which are output through the speaker. These outputs can also be transmitted by other means as disclosed elsewhere herein.

When a braille code is entered through the input buttons on the BIOTD, the microprocessor detects which buttons are pressed. In an example embodiment, the microprocessor turns ON the corresponding LEDSs on the front side of the BIOTD. The microprocessor then decodes the braille code into an ASCII code and the DTMF encoder creates a two-digit DTMF code. In an example implementation, for "a", which is coded as "41", the DTMF encoder sends high digit DTMF code "4" for 10 milliseconds, then pauses 20 milliseconds, and then sends low digit DTMF code "1" for 10 milliseconds. In an example implementation, after the DTMF encoder sends the code for "a", the corresponding LED that was previously turned ON is turned OFF.

In an example embodiment, an error detection scheme may be implemented. One possible scheme, among others, includes setting a time difference between the first tone length and the second tone length. Consecutive tone lengths should be different lengths, such as 12 msecs and 18 msecs. If, however, consecutive tone lengths are equal, then a transmission error is detected and the receiver can request retransmission of the tones.

To implement the bidirectional communication, the BIOTD is configured to route the microphone input source to either the DTMF decoder or to the speech recognition module. The DTMF decoder detects the DTMF tones in the reverse manner as the encoding process was described. The tones are decoded into the corresponding ASCII/braille codes and output from the BIOTD through the output actuator-buttons/solenoids of the back side of the BIOTD.

Figure 8:
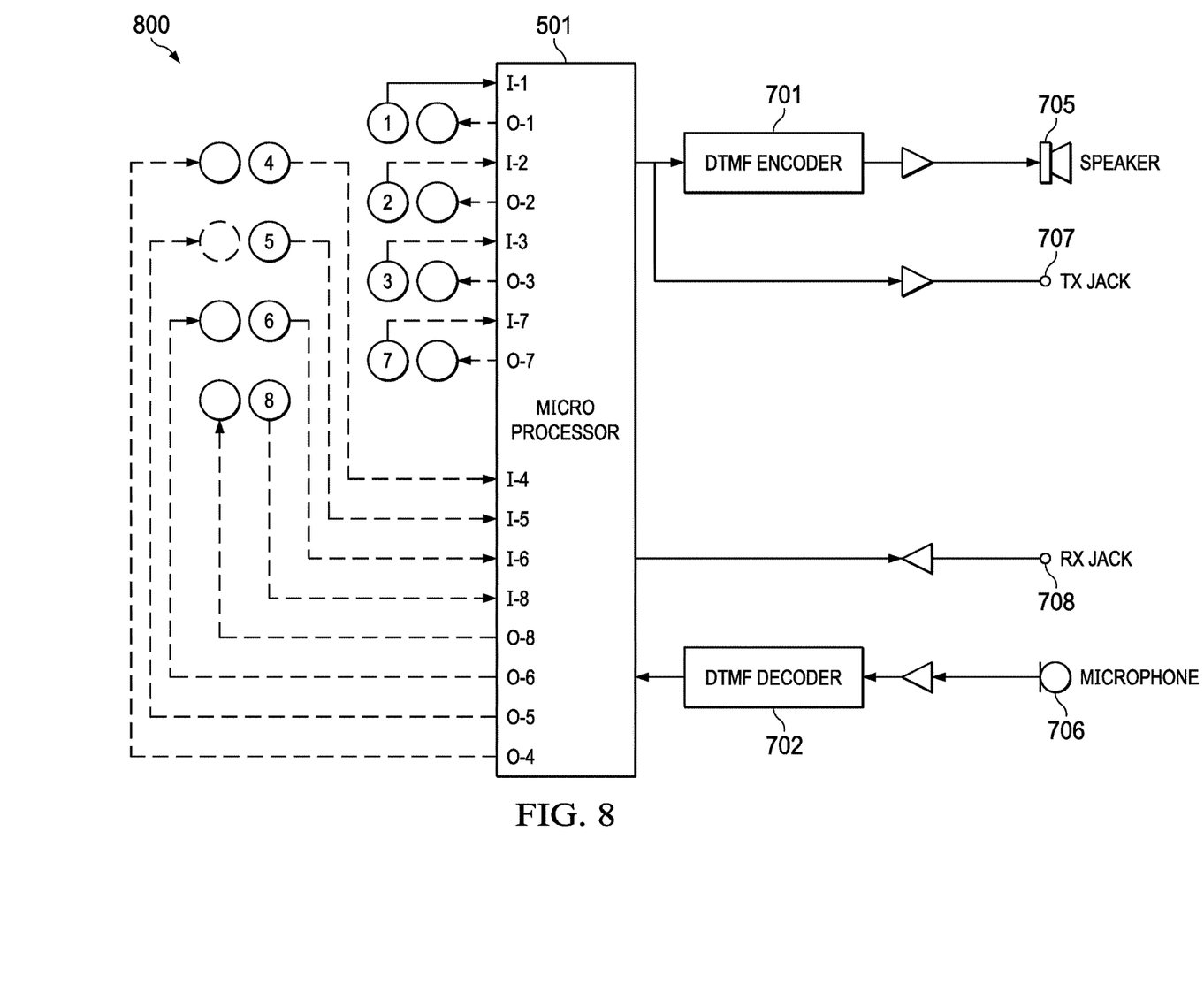
FIG. 8 illustrates a system view that shows an example of converting braille input codes to DTMF codes or straight to an output device for transmission and the reverse path for generating output braille codes, according to an embodiment of the present disclosure.

FIG. 8 provides an example embodiment of the acoustic implementation of the BIOTD, just as with the example of FIG. 7, but without the text to speech generator. Instead of implementing a text to speech generator, the example of FIG. 8 uses a transmit/receive interface to connect to other devices as described elsewhere herein.

Figure 9:
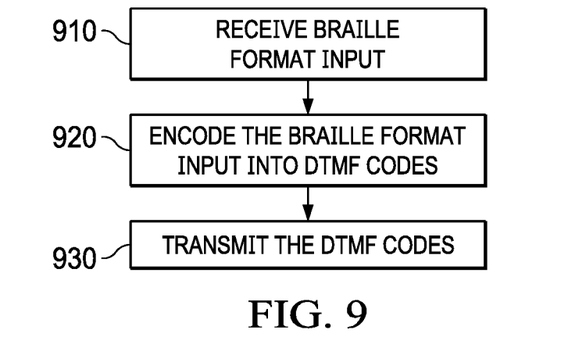
FIG. 9 is a flow diagram illustrating an example embodiment of a method of sending a braille communication.

FIG. 9 provides an example embodiment of a method of braille transceiving. In step 910, braille format input is received. In step 920, the braille format input is encoded into DTMF codes. In step 930, the DTMF codes are transmitted.

Figure 10:
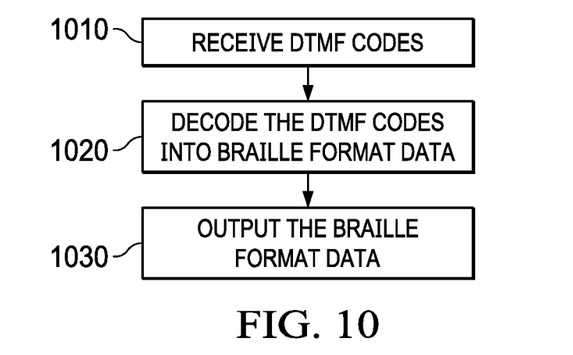
FIG. 10 is a flow diagram illustrating an example embodiment of a method of receiving a braille communication.

FIG. 10 provides an example embodiment of a method of braille transceiving. In step 1010, DTMF codes are received. In step 1020, the DTMF codes are decoded into braille format data. In step 1030, the braille format data is output.

BIOTD 502 preferably comprises transceiving module 800. Transceiving module 800 preferably comprises front side 300, back side 403, microprocessor 501, text to speech generator 700, DTMF encoder 701, digital logic elements 704, transmission interface 707, receiving element 708, DTMF decoder 702, speech recognition module 703, actuators 402, speaker 705, inputs 500 and audio sources 600. In some embodiments, the transceiving module 800 may be configured for: receiving a data signal, converting the received data signal to a braille coded signal, presenting the braille coded signal with actuated buttons, receiving a braille coded signal, converting the braille coded signal into one or more DTMF codes, and/or outputting the one or more DTMF codes through a speaker.

The front side 300 preferably comprises output LEDs 101. In some embodiments, front side 300 positioned on the front side comprises multiple output LEDs 101 to indicate that a button has been pressed on the back side. The back side 403 preferably comprises input buttons 400 and output indicators 401.

In some embodiments, microprocessor 501 may be configured for: converting input (braille, audio, ASCII keyboard, speech recognition, among others) to DTMF signals, configuring the output type of communication. The output type of communication may be selected based on the disability of the user, for example. If the user is blind, the input and output from the back side 403 of BIOTD 502 includes the input buttons 400 and the output indicators 401, converting between six-button and eight-button Braille codes or switching between input sources.

The text to speech generator 700 may be configured for receiving text from microprocessor 501, converting the text to speech and outputting to, for example, speaker 705. DTMF encoder 701 may be configured for generating DTMF codes. In an example embodiment, DTMF encoder 701 generated 2 DTMF tones. A first DTMF tone encodes the braille code input from buttons 1, 2, and 3 (and 7 in an eight-button configuration). A second DTMF tone encodes the braille input from buttons 4, 5, and 6 (and 8 in an eight-button configuration).

Digital logic elements 704 may be configured for interfacing DTMF encoder 701 and text to speech generator 700 with speaker 705.

In some embodiments, transmission interface 707 may include serial data cable, speaker, bluetooth module, computer audio capture device, telephone call RJ45 connector, telephone call acoustic coupler, VCR record input, mono audio recorder, stereo audio recorder, surround audio recorder, and/or web site widget feed. Transmission interface 707 may be configured for interfacing microprocessor 501 with various external devices.

In an example embodiment, receiving element 708 comprises microphone 706. Receiving element 708 may be configured for receiving a signal from inputs 500 and sending it to microprocessor 501. In some embodiments, receiving element 708 may include serial data cable, speaker, bluetooth module, computer audio capture device, telephone call RJ 45 connector, telephone call acoustic coupler, VCR record input, mono audio recorder, stereo audio recorder, surround sound audio recorder and/or web site widget feed.

DTMF decoder 702 preferably comprises DTMF detector 601, DTMF processor 602 and software translator 603.

Speech recognition module 703 may be configured for detecting speech on the input, for example from microphone 706, and processing the speech to convert the detected speech into braille codes in microprocessor 501.

In some embodiments, actuators 402 may include solenoids, microswitches, buzzers, vibrators, and piezo chips, among others. Actuators 402 may be configured for extending the output indicators. Speaker 705 may be configured for outputting audio signals including speech and/or DTMF tones.

In some embodiments, inputs 500 may include ASCII keyboard, output of 6-button single BIOTD, output of 3-button dual BIOTD, output of 8-button single BIOTD, output of 4-button single BIOTD, output of speech recognition module or output of USB cable.

In some embodiments, audio sources 600 may include cable, microphone, bluetooth module, video tape recorder, mono audio input, stereo audio input, surround sound audio input, podcast and/or set top box.

In some embodiments, input buttons 400 are used to form braille elements as the input from a user. The user, such as a blind person can form the braille code using the six input buttons 400 (or 8 in an eight-button configuration) and that code can be sent to another user by one or more of several methods disclosed herein.

In some embodiments, output indicators 401 are buttons or some other type of mechanical indicator that is actuated by actuators 402 such as, but not limited to solenoids, microswitches, and others. The user can place his fingers across the output indicators 401 so that he can feel each of the braille codes that are transmitted to BIOTD 502.

The microphone 706 may be configured for receiving audio signals and sending received audio signals to DTMF detector.

The DTMF detector 601 may be configured for detecting DTMF tones in the received audio signal and sending detected DTMF tones to DTMF processor 602.

In some embodiments, DTMF processor 602 may be defined as any microprocessor. DTMF processor 602 may be configured for converting/translating the detected DTMF tones into output codes such as, for example, braille codes.

Software translator 603 may be configured for converting the output of microprocessor 501 to various output types depending on the disability of the user.

In some embodiments, a data signal may include one or more DTMF signals, may be received at a movie theatre, received from a television, received from a pay phone booth, received from a street light, received from a pedestrian crossing traffic sign, received from a railroad crossing, received from a cell phone, received from a subway system, received from an airport landing system, received from an unmanned aerial vehicle, received from a traffic signal, received from a web site, received from electronic theater controls, received from a HAM radio, received from a commercial radio, an audio source, and/or received from a keyboard.

The systems and methods disclosed herein can be implemented in software, hardware, or a combination thereof. In some embodiments, the system and/or method is implemented in software that is stored in a memory and that is executed by a suitable processor situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer readable medium using electronic technology would include (but are not limited to) the following: an electrical connection (electronic) having one or more wires; a random access memory (RAM); a read only memory (ROM); and an erasable programmable read only memory (EPROM or Flash memory). A specific example using magnetic technology includes (but is not limited to) a portable computer diskette. Specific examples using optical technology include (but are not limited to) optical fiber and compact disc read only memory (CD-ROM).

Note that the computer readable medium could even be paper or another suitable medium on which the program is printed. Using such a medium, the program can be electronically captured (using, for instance, optical scanning of the paper or other medium), compiled, interpreted, or otherwise processed in a suitable manner, and then stored in a computer memory. In addition, the scope of the certain embodiments of the present disclosure includes embodying the functionality of the preferred embodiments of the present disclosure in logic embodied in hardware or software configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variations are within the scope of this disclosure, as determined by the appended claims when interpreted in accordance with the breadth to which they are fairly and legally entitled.

The invention claimed is:

1. An apparatus comprising:
   a user interface with indicators configured to transmit braille codes to a user and buttons configured to receive braille codes from the user, with a first set of buttons configured to be compressed by the user with a first hand, a second set of buttons configured to be compressed by the user with a second hand, a third set of indicators configured to be sensed by the user with the first hand and a fourth set of indicators configured to be sensed by the user with the second hand;

a transceiving interface configured to transmit and receive DTMF tones; and a processor configured to:
encode the braille codes into DTMF tones for transmission through the transceiving interface; and
decode the DTMF tones received though the transceiving interface into braille codes.

2. The apparatus of claim 1, wherein the apparatus comprises a single device consisting of six braille input buttons configured for inputting the braille codes into the input interface.

3. The apparatus of claim 2, wherein the processor is further configured to decode DTMF tones into braille output codes and wherein the single device further comprises:
an input interface configured for receiving the DTMF tones from another device; and
output actuators configured for outputting the braille output codes by actuating output indicators.

4. The apparatus of claim 3, wherein the actuators comprise at least one of solenoids, microswitches, servos, and stepper motors to actuate the output buttons.

5. The apparatus of claim 3, wherein the DTMF tones are received from at least one of a cable, microphone, Bluetooth module, video tape recorder, mono audio input, stereo audio input, surround sound audio input, podcast, and set top box.

6. The apparatus of claim 3, wherein the DTMF tones are received from an external device, including at least one of a movie theatre, a telephone, a cell phone, a streetlight, a traffic crossing sign, a traffic light, a railroad crossing indicator, subway system, train system, rail system, airport landing system, unmanned automated vehicle, a traffic signal, caution signal, a website, a board game, an arcade game, a video game, a cash register, and a point of sale device.

7. The apparatus of claim 1, wherein the apparatus comprises dual devices, each of the dual devices comprising three braille input buttons configured for inputting the braille codes into the input interface.

8. A method comprising:
receiving braille codes through a user interface with a first set of buttons of configured to be compressed with a first hand and a second set of buttons configured to be compressed with a second hand;
converting the braille codes to DTMF tones;
transmitting the DTMF tones through a transceiving interface;
receiving DTMF tones through the transceiving interface;
converting the DTMF codes to braille codes; and
outputting the braille codes through a third and fourth set of indicators on the user interface, the third set of indicators configured to be sensed with the first hand and the second set of indicators configured to be sensed with the second hand.

9. The method of claim 8, wherein the received braille code is a two-digit code and converting the braille codes to DTMF tones further comprises converting a first digit of the two-digit code into a first DTMF tone and converting a second digit of the two-digit code into a second DTMF tone.

10. The method of claim 9, wherein transmitting the DTMF tones comprises transmitting the first and second DTMF tones for different durations.

11. The method of claim 8, wherein consecutive tone durations are transmitted at different durations for error detection.

12. The method of claim 8, wherein outputting the braille codes comprises actuating output indicators on a braille output device.

* * * * *